(12) United States Patent
Scott

(10) Patent No.: US 6,700,698 B1
(45) Date of Patent: Mar. 2, 2004

(54) MULTI-PASS OPTICAL AMPLIFIER

(75) Inventor: Andrew M Scott, Worcestershire (GB)

(73) Assignee: QinetiQ Limited, Farnborough (GB)

( * ) Notice: Subject to any disclaimer, the term of this patent is extended or adjusted under 35 U.S.C. 154(b) by 0 days.

(21) Appl. No.: 10/019,685

(22) PCT Filed: Jul. 6, 2000

(86) PCT No.: PCT/GB00/02398

§ 371 (c)(1),
(2), (4) Date: Jan. 15, 2002

(87) PCT Pub. No.: WO01/03260

PCT Pub. Date: Jan. 11, 2001

(30) Foreign Application Priority Data

Jul. 6, 1999 (GB) ............................................ 9915667
Nov. 19, 1999 (GB) ............................................ 9927294

(51) Int. Cl.[7] .............................................. H01S 3/00
(52) U.S. Cl. ...................................... 359/347; 359/337
(58) Field of Search ................................ 359/347, 348, 359/337

(56) References Cited

U.S. PATENT DOCUMENTS

| 4,243,942 A | | 1/1981 | Glass |
| 5,568,309 A | * | 10/1996 | Rockwell ...................... 359/338 |
| 5,615,043 A | * | 3/1997 | Plaessmann et al. ......... 359/346 |
| 5,644,424 A | * | 7/1997 | Backus et al. ................ 359/347 |
| 5,689,363 A | | 11/1997 | Dane et al. |

OTHER PUBLICATIONS

Andrew N F et al; "Four–Pass YAG:Nd Laser Amplifier with Compensatin OFR Aberration and Polarization Distortions of the Wavefront"; Soviet Journal of Quantum Eletronics; vol. 22, No. 9, Sep. 1992; pp. 800–802; XP000323043.

Andrew N F et al; "Four–Pass YAG:Nd Laser Amplifier with Compensatin OFR Aberration and Polarization Distortions of the Wavefront"; Quantum Electronics; vol. 26, No. 1; Jan. 1996; pp. 19–22; XP000553779.

* cited by examiner

*Primary Examiner*—Mark Hellner
(74) *Attorney, Agent, or Firm*—Nixon & Vanderhye P.C.

(57) ABSTRACT

A multi-pass optical amplifier system is provided comprising an amplifier medium (20) and at least one relay imaging telescope (18, 24) for imaging light from the amplifier medium onto a primary light directing optical component, such as a mirror (26, 29) and for imaging light directed back from a primary light directing optical component (26, 28) into the amplifier medium so that light is re-passed through the amplifier medium. The system further includes a phase conjugate mirror arrangement for intercepting light between passes for the amplifier medium to generate a phase conjugate reflection of the light incident on it. Preferably, the system is arranged such that a light beam is incident on phase conjugate mirror (22), after having passed through the amplifier medium a predetermined number of times and the phase conjugate reflection retraces the path of the incident beam. The system may be arranged such that a light beam from the amplifier medium which is re-imaged into the amplifier medium is spatially separated from itself at at least one point in its path between passes of the amplifier medium in order that it can be intercepted by additional light directing optical components, such as a prism (38).

40 Claims, 10 Drawing Sheets

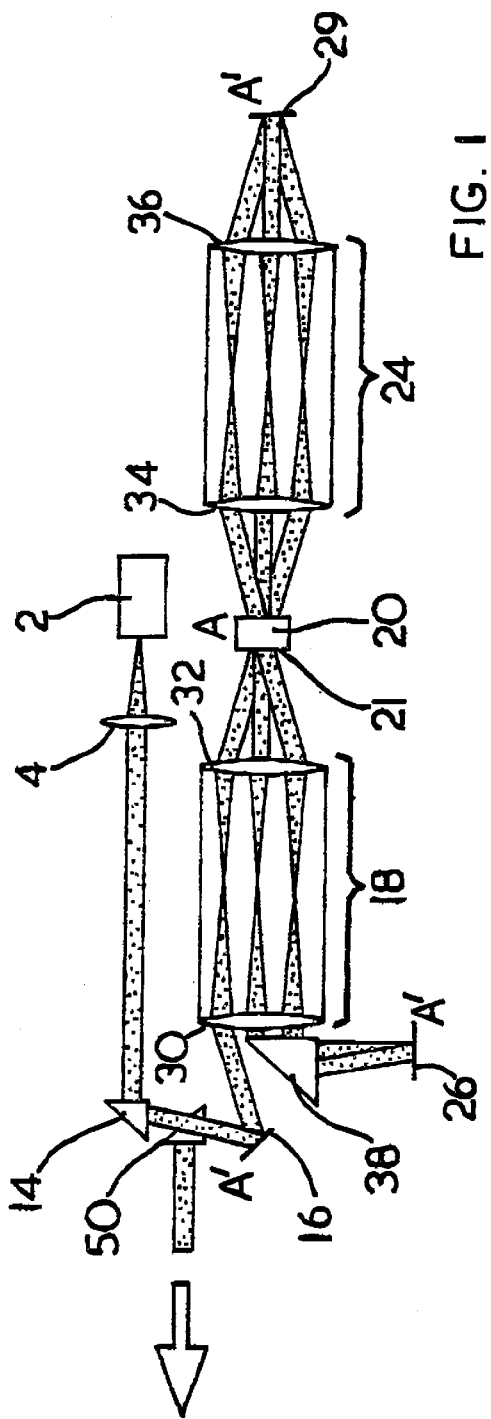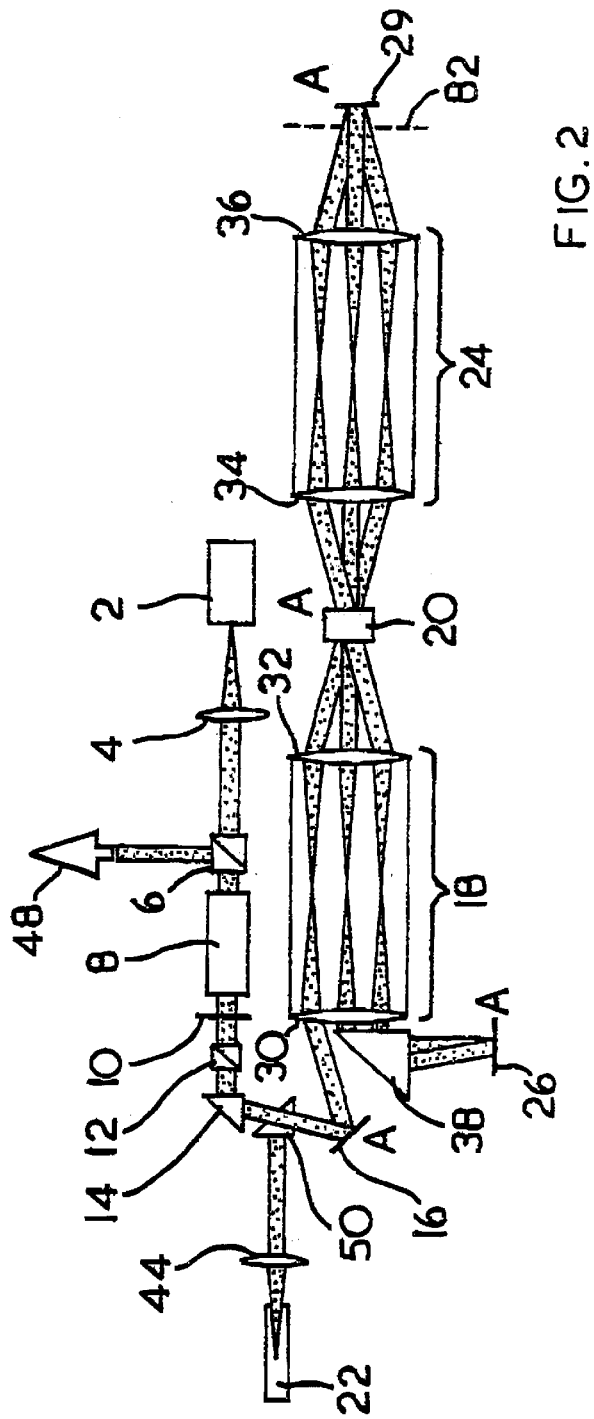

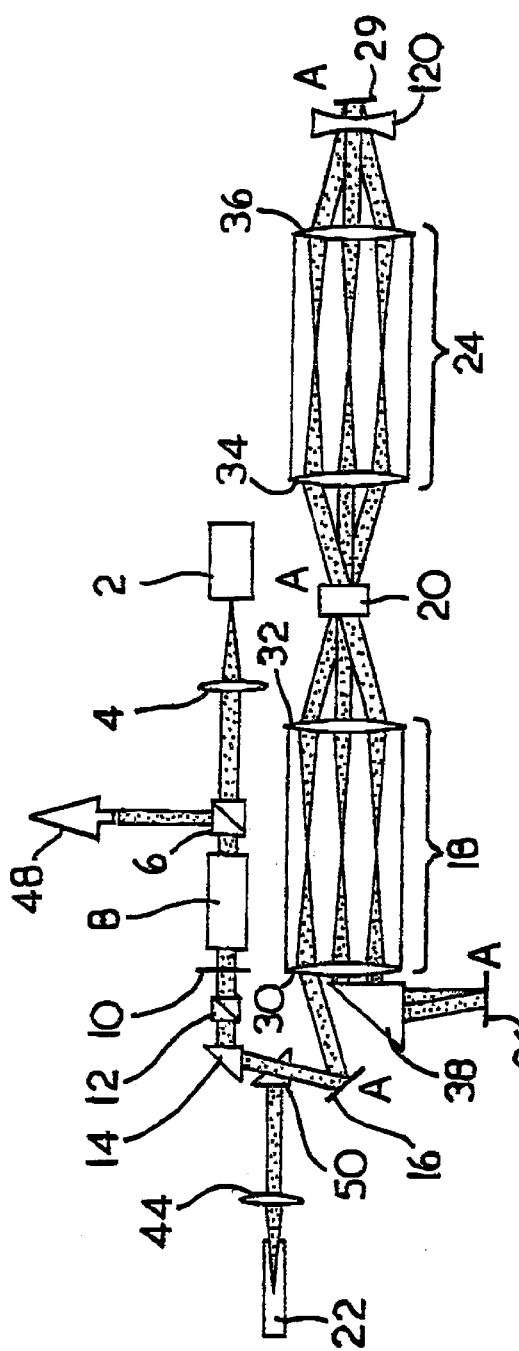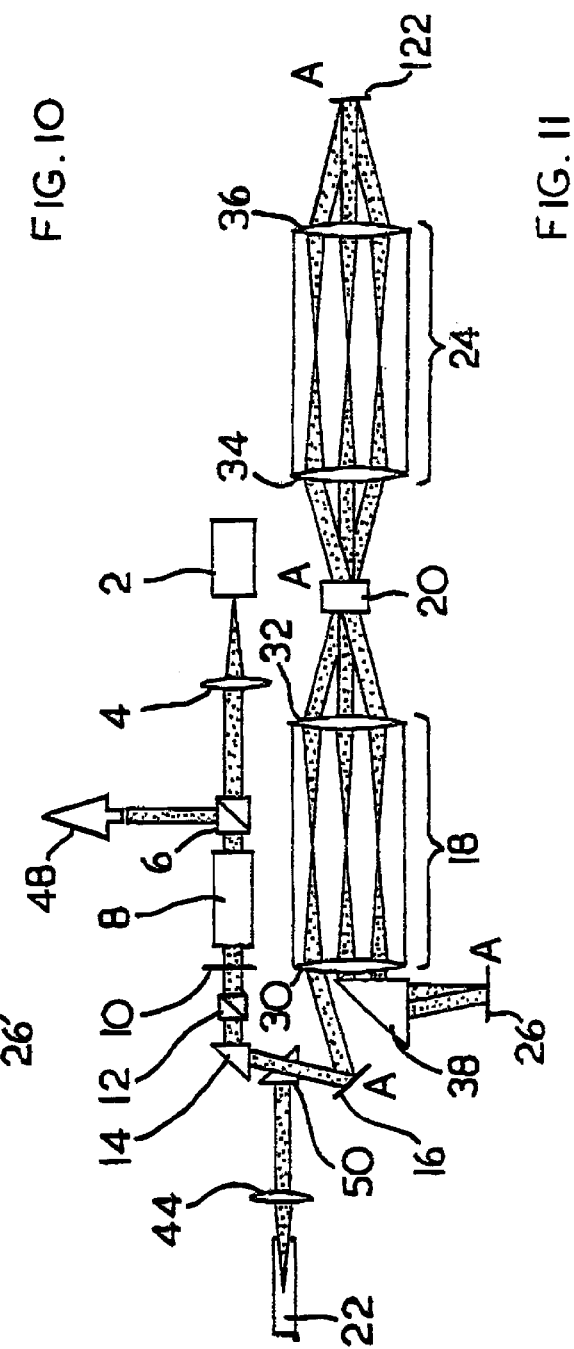

MULTI-PASS OPTICAL AMPLIFIER

This application is the U.S. national phase of international application PCT/GB00/02398 filed Jul. 6, 2000, which designated the U.S.

The present invention relates to optical amplifier systems and in particular to solid state and gas optical amplifier systems in which a light beam to be amplified is passed repeatedly through an amplifier medium in order to improve the gain of the amplifier system.

An optical amplifier is a basic component of a laser system and is used in almost every aspect of laser technology. Since lasers were first developed, optical amplifiers have been used to increase the output energies from laser oscillators. However, it is generally difficult to extract energy efficiently from an optical amplifier and efficient energy extraction usually requires the input of high energy light beams, so that the level of net gain is modest. This is a particular problem in amplifier systems which amplify a continuous wave light source.

In order to achieve both high gain and efficient energy extraction, cascades of progressively larger amplifiers have been used. However, this results in relatively expensive multi-component amplifier systems which can have complicated optical geometries in which it can be difficult to accurately align optical components making up the system.

An alternative way of improving gain and energy extraction is to pass a light beam two or more times through the amplifier medium of an amplifier system, optionally using non-linear phase conjugation to compensate for aberrations such as thermal distortions caused by pumping of the medium. A first example has been developed and is described by N. F. Andreev, S. V. Kuznetsov, O. V. Palashov, G. A. Pasmanik and E. A. Khazanov in "Four-pass YAG:Nd laser amplifier with compensation for aberration and polarisation distortions of the wavefront" in Soviet Journal of Quantum Electronics, Volume 22, pages 800–802 (1992). This document describes a system in which a beam is passed through an amplifier four times by using polarisation multiplexing and phase conjugation. This is the maximum number of passes that can be achieved by this approach because they exploit the two orthogonal polarisations and the two possible directions of collinear propagation and they separate beams by means of polarisers. A second example of such a system has been developed and is discussed in a paper by C. B. Dane, L. E. Zapata, W. A. Newman, M. A. Norton, L. A. Hackel entitled "Design and Operation of a 150 W Near Diffraction Limited Laser amplifier with SBS Wavefront Correction, published in IEEE Journal of Quantum Electronics Vol. 31, p148, January 1995. According to this system a light beam is repeatedly directed into an amplifier medium successively at different angles. The problem with this approach is that the optical geometry of the amplifier system is quite complicated and that the system is specific to pulsed laser systems and to a particular class of slab amplifier which can be used in a 9- and 11-bounce mode. Also, this type of amplifier system requires careful alignment of the optical components which make up the system.

WO95/22187 discloses an amplifier system in which a light beam is passed through an amplifier medium four times and which compensates for depolarisation of the light beam in the amplifier medium. The light from the amplifier medium is rotated in phase through 90° before being passed back into the amplifier medium. A relay imaging telescope is used in the arrangement for applying the phase rotation, to image the light beam from the amplifier through a polarisation rotator and onto a reflector and then back onto the amplifier medium. Oppositely directed beams overlap at all points along the path until they are separated by their polarisation which limits the number of passes which can be made through the amplifier medium without causing the system to oscillate. This limits the gain of the amplifier system disclosed in WO95/22187.

The present invention seeks to overcome some of the problems discussed above by providing a high gain multi-pass laser amplifier system in which a light beam can be repeatedly passed through the amplifier medium of the system using a simple geometry in which it is relatively easy to align the optical components of the system in order to achieve a high gain and efficient energy extraction. The present invention also seeks to provide an optical amplifier system which is generic in that it can be applied to a large number of amplifier mediums. The present invention also seeks to provide a multi-pass amplifier suitable for continuous wave (cw) applications as well as for pulsed operation.

According to the present invention there is provided a multi-pass optical amplifier system comprising:

an amplifier medium;

at least one relay imaging telescope for imaging light from the amplifier medium onto a primary light directing optical component and for imaging light directed back from a primary light directing optical component into the amplifier medium so that light is re-passed through the amplifier medium, and a phase conjugate mirror arrangement for intercepting light between passes of the amplifier medium to generate a phase conjugate reflection of the light incident on it.

The use of phase conjugation in combination with relay imaging enables high gain operation with significant levels of energy extraction from the amplifier medium. The phase conjugate mirror is preferably located so that light enters it after having passed through the amplifier medium some predetermined number of times. It produces a beam which is conjugate in phase to the beam incident on it, and this conjugate beam retraces the path of the incident beam back through the system to the input point. At this point it has high energy and a spatial phase which is conjugate to the phase of the input beam, so that the high energy beam is of good optical quality. For a phase conjugate mirror, such as a stimulated Brouillon scattering (SBS) cell, which has a threshold power for the input light below which no conjugate beam is generated, the phase conjugate mirror will act as a shutter or an isolator. Thus, gain reduction due to the effects of low power amplified stimulated emissions (ASEs) generated within the system which have an amplitude below the threshold of the phase conjugate mirror is prevented. For pulsed operation of the system the phase conjugate mirror acts as a shutter that only opens when the input beam arrives. This is because the threshold of the phase conjugate mirror is only exceeded when the light pulse is incident on it. In the case of a continuous wave (cw) input beam, the phase conjugate mirror acts as a spectral filter, so that only light in the same spectral bandwidth as the input beam is reflected and so as such it also acts as an inhibitor of ASEs. This is ause only light in the spectral bandwidth of the input beam will exceed the threshold of the phase conjugate mirror.

Preferably, the system is arranged such that a light beam from the amplifier medium which is re-imaged onto the amplifier medium is spatially separated from itself, ie. it does not overlap itself, at at least one point in its path between passes of the amplifier medium to enable it to be intercepted by at least one additional light directing optical component.

The present invention also provides a multi-pass optical amplifier system comprising an amplifier medium and at least one relay imaging telescope for imaging light from the amplifier medium onto a primary light directing optical component and for imaging light directed back from the primary light directing optical component into the amplifier medium, wherein the system is arranged such that a light beam from the amplifier medium which is re-imaged onto the amplifier medium is spatially separated from; itself, ie. it does not overlap itself, at at least one point in its path between passes of the amplifier medium to enable it to be intercepted by at least one additional light directing optical component. This arrangement may include a phase conjugate mirror arrangement as described above for intercepting light between passes of the amplifier medium to generate a phase conjugate reflection of the light incident on it.

If a light beam passes through an aperture at some unknown angle, then it may fail to pass through a second aperture some distance away from the first. This problem can be solved by using a relay imaging telescope, which generally consists of two converging lenses separated by the sum of their focal lengths to image the first aperture onto the second aperture. Then light incident on said first aperture will pass through the second aperture for a relatively wide range of angles of incidence of the beam on the first aperture. Using relay imaging telescopes enables the optical components in the amplifier system according to the present invention to be aligned easily. By spatially separating a light beam travelling through the amplifier system from itself, ie. by causing the light beam not to overlap itself, at some point between passes of the amplifier medium, different parts of the light beam can by intercepted by additional optical components in order to re-direct the light beam through the amplifier medium many times or to remove a beam from the system. Thus, the beam goes through the amplifier many times using one set of optical components. The use of relay imaging telescopes ensures that the light beam stays as an approximately collimated beam as it does so and that it repeatedly goes through the same amplifier aperture. Each time it goes through the amplifier, the light beam experiences gain, and repeatedly extracts energy (or power in the case of continuous lasers) from the same volume of gain material.

The light beam is spatially separated from itself by causing the primary light directing optical component to re-direct the light beam back to the amplifier medium along a different path from the path on which the light beam was incident on the component, for example along a path at a different angle to the optical axis of the system from the incident path or along a path which is parallel to but laterally spaced (with respect to the optical axis of the system) from the incident path. Use of the relay imaging telescopes makes the system according to the present invention "self imaging" in that the aperture of the amplifier is imaged onto the primary light directing optical component by a relay imaging telescope, and this component directs the light back through the same telescope so that it is imaged back on to the aperture of the amplifier, so that any collimated beam which goes through the aperture once will immediately go through it again unless intercepted by specially placed additional optical components. In this way light travelling along different paths between passes of the amplifier medium which become spatially separated from each other can be re-imaged onto the aperture of the amplifier medium by a relay imaging telescope. This self imaging property also makes the system according to the present invention relatively simple to align because small errors in alignment do not lead to the loss of light from the system.

The geometry of the amplifier system according to the present invention makes it possible to cause the light path of a light beam passing through the system to overlap at the amplifier medium and spatially separate from itself at at least one part of its path between passes of the amplifier medium, for example, the telescope lenses. In this way each pass of the light beam through the amplifier medium can travel through a large volume of the amplifier medium in order to promote high gain and energy extraction on each pass. Furthermore, the spatial separation of the light beam from itself can allow light to be tapped out of the system or to be re-directed through the amplifier medium along different paths to increase the number of passes through the amplifier medium that can be achieved. The spatial separation of the light beam from itself can also prevent parasitic oscillations within the amplifier system.

In a first preferred embodiment of the present invention a first relay imaging telescope is located adjacent to a first side of the amplifier medium for imaging an aperture of the amplifier medium onto at least one primary light directing optical component located to said first side of said amplifier medium and a second relay imaging telescope is located to a second side of the amplifier medium for imaging the aperture of the amplifier medium onto at least one primary light directing optical component located to said second side of the amplifier medium. Thus, the amplifier medium is located between two relay imaging telescopes which each image the aperture of the amplifier medium onto various appropriately positioned primary light directing optical components which repeatedly pass a light beam through the amplifier medium.

In a second preferred embodiment the amplifier medium itself comprises a reflecting surface located at a first side of said amplifier medium and a relay imaging telescope is located to a second side of said amplifier medium for imaging an aperture of the amplifier medium onto at least one primary light directing optical component located to said second side of said amplifier medium.

The amplifier system according to the present invention preferably additionally comprises input and output optical components which intercept the light beam where it is spatially separated from itself and co-operate with the primary light directing optical component(s) to direct a light beam from an input of the amplifier system, repeatedly through the amplifier medium and then to an output of the system. To improve the ease of optical alignment of the system it is preferred that the input and output optical components are arranged such that the relay imaging telescope(s) images an aperture of the amplifier medium onto the input and output optical components.

The amplifier system is preferably arranged with a geometry such that a light beam passing through the system overlaps its light path in the amplifier medium as it passes repeatedly through the amplifier medium in order to improve gain and energy extraction on each pass of the amplifier as such overlapping enables the same volume of the amplifier medium to be traversed by a light beam passing through the system on each pass. It is further preferred that the light beam does not overlap at the input and output of the system in order to improve the ease with which a light beam can be directed into and out of the system.

Preferably, a light beam travelling along a path from the amplifier medium via the relay imaging telescope and then back to the amplifier medium is spatially separated from itself at or near a focal plane of the relay imaging telescope. This can enable telescope lenses of relatively small focal lengths to be used in the amplifier system according to the present invention.

It is preferred that at least one of the primary light directing optical components comprises a mirror or a prism.

It is also preferred that at least one of the input and/or output optical components comprises a mirror or a prism.

Where phase conjugation is used, the system can additionally comprises a Faraday isolator arrangement for isolating a light beam input into the system from a light beam output from the system.

Phase distortion can be compensated for by making at least one of the light directing optical components an adaptive mirror. In this way it is possible to compensate for phase distortion for each return path through the amplifier medium.

In at least one embodiment, in order to stop parasitic oscillations within the amplifier system before they become dominant, it is preferred that a shutter means is introduced into a part of the light path of a light beam passing through the system which part passes between two light directing optical components, which shutter means can be closed to block the passage of light between the two light directing components at predetermined intervals.

It is possible to produce a high power output beam with a controlled phase front by controlling the phase front of a lower power input beam by adding to the system a beam steering or phase controlling means adjacent to the input of the system and possibly at least one further relay imaging telescopes wherein the system is arranged such that the aperture of the beam steering means is imaged via the further relay imaging telescopes onto an aperture of the amplifier medium.

The amplifier system according to the present invention can be extended to a system comprising two or more amplifying mediums, by coupling each amplifying medium to another, or the other, by a relay imaging telescope. This can generate further increases in the gain of the amplifier system.

The relay imaging telescopes used in the present invention may have a transfer matrix of the type $$P_T = \begin{bmatrix} -1/M & 0 \\ 0 & -M \end{bmatrix}$$

where M is a positive or a negative number.

It is possible that a relay imaging telescope used in the amplifier system according to the present invention can be made of compound lenses.

According to a second aspect of the present invention there is provided a method of amplifying a beam of light by repeatedly passing said beam through an amplifier medium using a primary light directing optical component by imaging light from the amplifying medium onto said primary light directing optical component and imaging light directed back from a primary light directing optical component back into the amplifier medium using at least one relay imaging telescope and intercepting light between passes of the amplifier medium and using a phase conjugate mirror to generate a phase conjugate reflection of the light incident on it.

This second aspect of the present invention has the same preferred features and exhibits the same advantages as the first aspect of the present invention described above.

There is also provided a method of amplifying a beam of light by repeatedly passing said beam through an amplifier medium using a primary light directing optical component by imaging light from the amplifying medium onto said primary light directing optical component using at least one relay imaging telescope and imaging light directed back from the primary light directing component back into the amplifier medium wherein a light beam from the amplifier medium which is re-imaged into the amplifier medium is spatially separated from itself at at least one point in its path between passes of the amplifier medium so that it can be intercepted by additional light directing optical components.

The present invention will now be described by example only with reference to the following Figures in which:

FIG. 1 shows a plan of the geometry of an optical amplifier system according to a first embodiment of the present invention in which a light beam is passed 6 times through an amplifier medium of the system.

FIG. 2 shows an alternative geometry to that shown in FIG. 1 which doubles the number of passes through the amplifier medium by using a phase conjugate mirror.

FIG. 10 shows a plan of the geometry of an optical amplifier system according to a third embodiment of the present invention in which a light beam is passed twelve times through an amplifier medium and focussing error correction is made using a compensation lens.

FIG. 11 shows a plan of the geometry of an optical amplifier system according to a fourth embodiment of the present invention in which a light beam is passed twelve times through an amplifier medium and phase error correction is made using an adaptive mirror.

Figure 3:
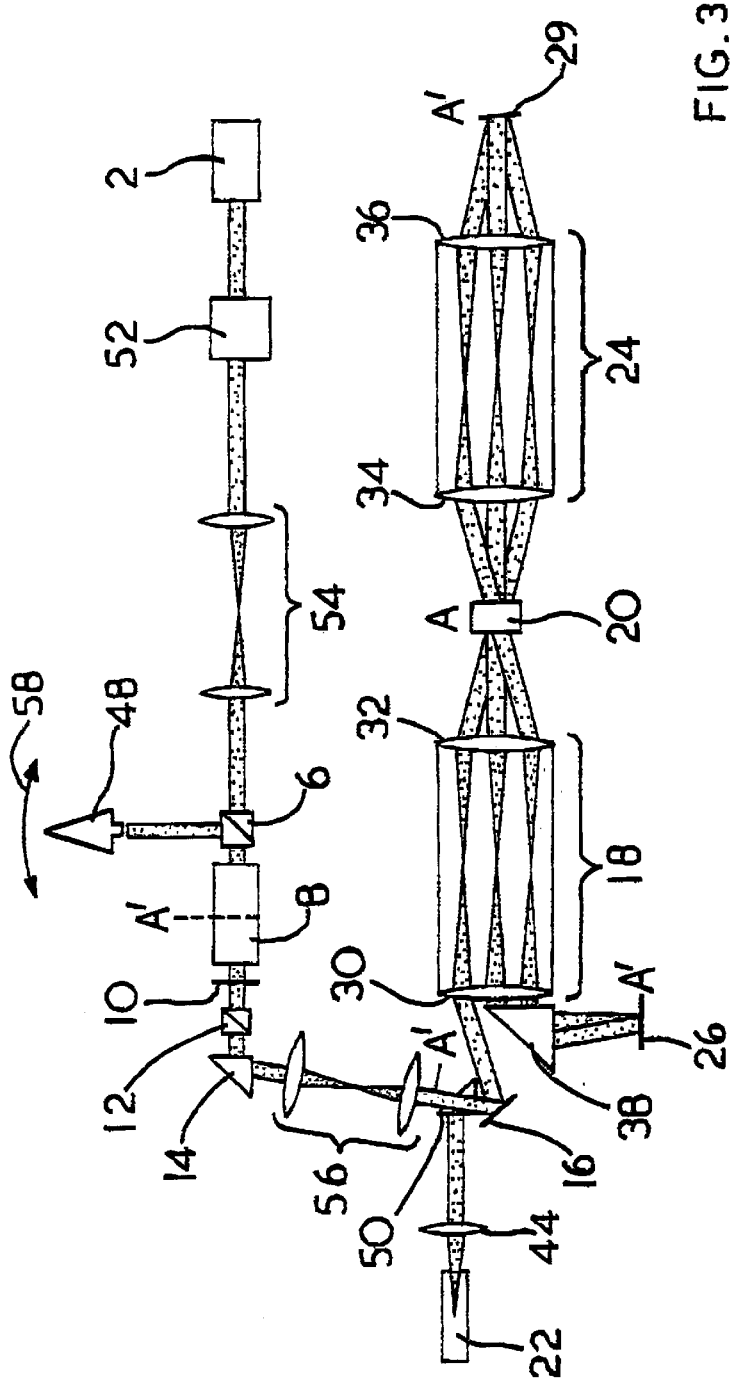
FIG. 3 shows an alternative geometry to that shown in FIG. 2 in which the direction of the output beam from the laser amplifier system can be steered.

FIG. 1 shows a multi-pass solid state optical amplifier system. The amplifier comprises a solid state amplifier medium (20) which is located between two relay imaging telescopes (18) and (24). Each relay imaging telescope (18, 24) is formed by two convex lenses separated by the sum of their focal lengths, so that a collimated beam passing through either of the telescopes remains collimated. A convergent or divergent beam the same degree of convergence or divergence. The amplifier medium (20) and telescopes (18, 24) are arranged such that each telescope (18, 24) images the aperture of the amplifier medium (20) onto reflecting components, such as mirrors (26, 29), which reflecting components return the light beam back to the amplifier medium (20) via the relevant telescope (18, 24). Thus a collimated light beam which has passed through the aperture of the amplifier will be directed by the telescope to form a collimated beam incident on the image of the amplifier aperture at reflecting components such as mirror (26) or mirror (29). It will then be redirected by these reflecting components back through the telescope and pass back through the aperture of the amplifier, again as a collimated beam.

In the optical geometry shown in FIG. 1, a laser (2) generates a beam of light which is directed by lens system (4) and prism (14) onto a coupling mirror (16) into the first telescope (18) of the amplifier system. The role of the lens system (4) is to convert the output of the laser into a collimated beam with a diameter which matches the diameter of the amplifier. The coupling mirror (16) is located so that it is in the plane of the relay image of the amplifier medium (20).

The laser (2) was a diode-pumped Nd YAG oscillator with an output energy of 50 µJ in a 25 ns pulse at a variable repetition rate of up to 1 kHz in a TEM00 and a single longitudinal mode.

Figure 4:
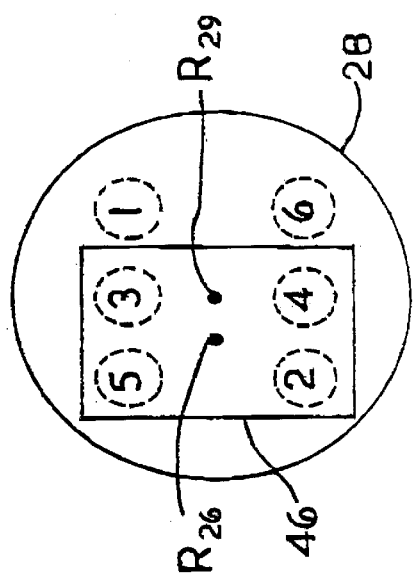
FIG. 4 shows a view of the aperture of the first telescope lens, the aperture of the first prism and the positions of successively reflected light beams passing through the systems in the geometry of FIG. 1 or 2.

The first aperture (28) of the telescope (18) (the aperture of lens (30) which is the left lens of the telescope (18) in FIG. 1) is shown in FIG. 4. The position of the light beam reflected into the telescope (18) by the coupling mirror (16) is shown at position 1 in the aperture (28).

Relay image telescope (18) is made up of two plano-convex lenses (30, 32) each with a focal length f=20 cm and separated by a distance of 2f. The centre of the amplifier medium (20) is located an optical distance of f to the right of lens (32) and mirrors (16) and (26) are located at an optical distance f to the left of the lens (30) at the image plane of the telescope (18). Similarly, relay image telescope (24) is made up of two plano-convex lenses (34,36) each with a focal length f=20 cm and separated by a distance of 2f. The centre of the amplifier medium (20) is located an optical distance of f to the left of the lens (34) and the mirror (29) is located at an optical distance f to the right of the lens (36) at the image plane of the telescope (24). Both telescopes are located in an evacuated chamber to avoid air breakdown by the light beam passing repeatedly through them.

The relay imaging geometry used in the relay image telescopes described herein can be analysed using ray matrices which are known to those skilled in the art.

The use of ray matrices is well established in predicting the performance of optical systems. A column matrix r=(x,s) can be used to represent a ray with displacement x from the optic axis and slope s. A 2×2 matrix P can be written which represents the optical properties of an optical element, so that the product P.r gives a new column matrix $r_1$ which represents a ray after it has passed through the optical element. The ray matrix for a multi-element system is determined by multiplying the appropriate matrices together in the order in which the light passes through the components.

For a relay image telescope with lenses having respective focal lengths $f_1$ and $f_2$, separated by space $f_1+f_2$ and with spacing between the object plane and the first lens being y and the spacing between the second lens and the image plane being $z=f_2/f_1(f_1+f_2-[f_2/f_1.y])$, then the ray matrix for that telescope is $$P_T = \begin{bmatrix} -1/M & 0 \\ 0 & -M \end{bmatrix}$$

where $M=f_2/f_1$ is the magnification of the telescope.

Thus, the image is magnified and inverted by the relay imaging telescope. Thus, if a ray incident on a first side of the telescope is converging to a point $f_T$ beyond the original aperture (aperture from which the incident ray comes) the resulting ray exiting the other second side of the telescope will converge to a point at a distance $M.f_T$ beyond the relay image plane. If that ray now passes back through the relay image telescope in the opposite direction, the ray matrix for the reverse passes through the telescope is $$P_{T'} = \begin{bmatrix} -M & 0 \\ 0 & -1/M \end{bmatrix}$$

The total transit from the aperture of the amplifier medium to the mirror or prism at the end of the relay telescope and then back to the amplifier medium then becomes $$P_{T'T} = \begin{bmatrix} 1 & 0 \\ 0 & 1 \end{bmatrix}$$

Any telescope which has a transfer matrix of the type described above (where M is either a positive or a negative number) will act as a suitable imaging telescope.

The amplifier medium (20) was a diode-pumped Nd YAG slab with dimensions 8.6 mm by 5.3 mm, by 88 mm and has Brewster cut faces. The amplifier medium (20) supported nine total internal reflections on a single transit forming a zig-zag path in the plane of FIG. 1. The medium (20) could be operated at a variable repetition rate and could achieve a single pass gain of 2.5 at a repetition rate of 400 Hz.

Thus, the light beam from the laser (2) which is directed by mirror (16) located an optical distance f from lens (30) into telescope (18) passes through the telescope (18) and is imaged onto the aperture of the amplifier medium (20) thus passing through the amplifier medium (20) and into telescope (24), which images this light beam onto mirror (29). This light beam is the first pass light beam, and its position in the aperture (28) of telescope (18) is shown by position I in FIG. 4. The second pass light beam which is reflected from mirror (29) is imaged by telescope (24) onto the aperture of the amplifier medium (20) and is then imaged by telescope (18) via prism (38) onto mirror (26). The position of the second pass light beam in the aperture (28) of telescope (18) is shown by position 2 in FIG. 4. It can be seen that position 2 also lies within the aperture (46) of the prism (38). The alignment of the components of the amplifier system which determines the positions of the light beam passes in the aperture (28) will be described below. The mirror (26) reflects the second pass light beam incident on it back through the telescope (18) as a third pass light beam, which is imaged by the telescope (18) onto the aperture of the amplifier medium (20) and is then imaged by telescope (24) onto mirror (29). The position of the third pass light beam in the aperture (28) of telescope (18) is position 3 in FIG. 4, which is also within the aperture of the prism (38) which directs the third pass light from the mirror (26) into telescope (18).

Mirror (29) again returns the beam back into telescope (24). Telescope (24) images the fourth pass beam onto the aperture of the amplifier medium (20) and then the forth pass beam passes into telescope (18) and is imaged onto mirror (26). The forth pass beam is directed onto mirror (26) by prism (38) and in FIG. 4 is shown at position 4 within the aperture (28) of telescope (18) and within the aperture (46) of the prism (38). The fourth pass beam is reflected by mirror (26) back into telescope (18) via prism (38) as a fifth pass beam which is shown in FIG. 4 at position 5 located within apertures (28) and (46). The fifth pass beam is imaged by telescope (18) onto the aperture of the amplifier medium (20) and into telescope (24) which images the fifth pass beam onto mirror (28). The fifth pass beam is reflected by mirror (29) as a sixth pass beam back into the telescope (24) which images the sixth pass beam onto the aperture of the amplifier medium (20). The sixth pass beam is then imaged by telescope (18) onto the coupling mirror (16) which couples light out of the amplifier system. The sixth pass beam is shown at position 6 in FIG. 4 and lies outside the aperture (46) of the prism (38) and so is not directed onto mirror (26). Instead the coupling mirror (16) is positioned to intercept the sixth pass beam.

It should be noted that the light beam from laser (2) which is directed onto mirror (16) as a first pass beam into telescope (18), is superimposed on the sixth pass beam at mirror (16), but at aperture (28) it lies above the sixth pass beam and at prism (50) it lies below the sixth pass beam. This is because FIG. 1 is a plan view of the optical geometry of the amplifier system. This can be seen from the positioning of the first pass light beam at 1 in FIG. 4 with respect to the position of the sixth pass light beam at 6, below position 1 in FIG. 4. In this way at the aperture (28) of telescope (18) the first, third and fifth pass beams lie above the sixth, forth and second pass beams respectively.

Prism (50) is positioned where the sixth pass beam lies above the first pass beam and intercepts the sixth pass beam and directs it away to form an output beam.

Referring again to FIG. 4, which shows the aperture (28) of the lens (30) of telescope (18) and the aperture (46) of the prism (38) and two reflection points, $R_{26}$ the reflection point of mirror (26) and $R_{29}$ the reflection point of mirror (29). Any light beam passing through a first point (eg. point 1) on the lens aperture (28) and travelling towards mirror (29) will be reflected back through the aperture (28) at a second point (eg. point 2) which is the mirror image of the first point about point $R_{29}$. Similarly, any light beam passing through a third point (eg. point 2) on the lens aperture (28) and travelling towards mirror (26) will be reflected back through the aperture (28) at a forth point (eg. point 3) which is the mirror image of the third point about point $R_{26}$. Thus, in FIG. 4 we see that the first path beam enters the aperture (28) past the edge of the prism (38), and after six passes through the amplifier system (1) the sixth pass beam exits past the edge of the prism (38).

In FIG. 4 the size of each pass beam is shown by the dotted lines and so it can be seen that at telescope lens (30) the pass beams are spatially separated. This enables some of the beams (2 to 5) to be intercepted by the prism (20).

The optical components in the amplifier system of FIG. 1 are aligned as follows. Mirror (16), telescopes (18,24) and the amplifier medium (20) are first set in place. The passage of the beam through the amplifier medium is determined by the position of the beam from the laser (2) on mirror (16). This is optimised by adjusting the orientation of prism (14). Mirror (29) is then inserted. When both the amplifier medium (20) and mirror (29) are in place, it is possible to steer mirror (16) over a range of angles, and during this the position of the beam on the aperture of the amplifier medium (20) and on mirror (29) is unchanged. Then the location of the beam from the mirror (16) on the aperture (28) of the telescope (18) is set at position 1 in accordance with FIG. 4 by adjusting the angular alignment of the mirror (16). The location of the beam from the mirror (29) on the aperture (28) is set at position 2 in accordance with FIG. 4 by adjusting the angular position of the mirror (29). The prism (38) and mirror (26) are then set in place and their angular alignment is adjusted so that the location of the beam from the mirror (26) is at position 3 in the aperture (28) in accordance with FIG. 4. Once this has been done, all the pass beams will be correctly positioned in the aperture (28) of telescope (18) and the sixth pass beam is passed back to coupling mirror (16). Finally, prism (50) is installed to reflect the output beam away from other components.

The first key feature of the geometry shown in FIG. 1 is that the amplifier medium (20) is located between two relay image telescopes (18, 24) and each telescope images the amplifier medium aperture (A) onto mirrors (26) and (29) forming images A'. For a large range of angles, any collimated light ray which passes through the aperture of the amplifier medium (20) is imaged by a telescope onto mirror (29) or (26) and is re-imaged by the same telescope back onto the aperture of the amplifier medium (20). This ensures that any ray which passes once through the amplifier medium, will pass again and again through the amplifier medium until the telescope aperture or some component at the telescope aperture prevents it. This allows the beam to pass many times through the same volume, being amplified on each occasion, and extracting an additional fraction of the stored energy (or available power) on each transit.

The second key feature of the geometry shown in FIG. 1 is that all the pass beams may overlap at the amplifier medium but do not overlap on the telescope lenses adjacent to which the directional components such as mirrors or prisms are located. This enables individual beams to be intercepted and individually manipulated by locating optical components close to the telescope lenses, for example to couple light into and out of the amplifier system. The non-overlapping of beams in this way also helps to prevent closed light loops from being formed within the amplifier system. Such closed loops in the system can lead to parasitic oscillations of a resonator cavity formed by mirrors (26) and (28). In practice this second key feature may result in the use of relay imaging telescopes with lenses;which have a relatively long focal length.

It is not always necessary to meet the requirements of the second key feature for both telescopes, for example in the FIG. 1 geometry discussed above, the light beams may overlap on all the telescope lenses except lens (30) adjacent to components (16) and (38) which intercept different light pass beams exiting from telescope (18) at lens (30).

One technique for reducing aberrations in an amplifying system is to use phase conjugation. This can be achieved by focussing a pulsed single frequency beam into an SBS cell containing material such as $SnCl_4$. When the input energy into the cell is sufficiently high, it causes Stimulated Brillouin Scattering to occur, and a scattered beam is generated that will propagate in the opposite direction to the incoming beam, and exactly retrace its path. If the incoming beam is aberrated by the amplifier system, then the conjugate beam retraces the path and is amplified further but emerges free from aberration. This is implemented in the way shown in FIG. 2. The use of an SBS cell (22) as described above will correct aberrations generated within the amplifier system such as thermal lensing within the amplifier medium (20) and spherical aberrations caused by the pass beams passing through the telescope lenses at points displaced from the centre of the lens in the horizontal direction. An SBS cell coherently scatters light when the incident power exceeds a threshold level and this threshold nature can prevent gain depletion caused by amplified stimulated emission (ASE). An SBS cell can also be used in the same way in continuous wave applications to provide phase conjugation.

The system in FIG. 2 comprises an additional set of elements, to those in FIG. 1, located between the laser (2) and the amplifier system, and also includes a phase conjugate mirror device (22) located at the output of the amplifier system in order to produce a twelve pass amplifier system. The phase conjugate mirror comprises an SBS cell (22) containing a liquid such as $SnCl_4$ and a lens (44) which brings the collimated output from the amplifier to a focus inside the SBS cell. When a beam is input into the amplifier system, it is amplified and passes to the phase conjugate mirror device, where it is reflected and returns to the input of the amplifier system, retracing the input beam exactly and being further amplified. By the time it reaches the input point it has doubled the number of transits through the amplifier system and it is almost free from aberration.

In FIG. 2, a Faraday isolator system is used to separate the input beam from the amplified output beam. The isolator system comprises two dielectric prism polarisers (6) and (12), a Faraday rotator (8) and a half wave plate (10). The polarising prisms (6,12) transmit horizontally polarised light and reflect vertically polarised light. The polariser (6) passes horizonally polarised light from the laser (2) to the Faraday rotator (8) which generates a +45° phase shift in light passing through it from right to left and generates a −45° phase shift in light passing through it from left to right. Thus, this horizontally polarised light beam from the polariser (6) has a +45° phase shift added to it after it has passed through the rotator (8). Light from the rotator (8) then passes through the 450 phase shifter (10), which returns it to a horizontal polarisation which passes through the polariser (12). The light from the polariser (12) is then directed by a prism (14) and a coupling mirror (16) into the first telescope of the amplifier system. When the conjugate beam retraces the path back through the amplifier system it eventually returns to mirror (16) and then returns to the Faraday isolation system. Any vertical polarised component is reflected by the polariser (12), and the horizontally polarised beam passes through the half wave plate (10) where the polarisation is rotated by 450, and the Faraday rotator (8) which rotates the polarisation by a further −45°. The emerging beam is now vertically polarised and it is reflected by polariser (6) to form an output beam (48). Other alternative decoupling schemes are known.

In the FIG. 2 arrangement, the input beam from the laser (2) was measured to have an energy of 50 $\mu$J in a 25 ns pulse, and was elliptical with diameters of 2.58 mm and 3.71 mm and not more than 1.1 times the diffraction limit in either direction. When six passes were made of the amplifier medium (20) with no pumping of the amplifier medium, the transmission coefficient of the amplifier system was 65% and aberration was detected in the output beam. When the amplifier medium was operated at a repetition rate of 400 Hz with a single pass gain of 2.5, the gain after 6 passes was 300. This resulted in 13 mJ emerging from the system after six passes towards the SBS cell (22), and demonstrated that the scheme in FIG. 1 can be operated effectively.

The output from the amplifier system after six passes was directed into the SBS cell (22), and this produced a conjugate beam with an energy of 6 mJ. This was further amplified by six more passes of the amplifier medium (20) leading to an output energy at (48) of 50 mJ. The output beam had diameters of 1.73 mm and 3.89 mm and divergences of 0.89 mrad and 0.7 mrad, corresponding to 1.2 times the diffraction limit in the horizontal plane (ie. in the plane of the paper) and two times the diffraction limit in the perpendicular plane. The beam emerging from the amplifier system after the first six passes was elliptical and of poorer optical quality. This may be due to off-axis aberrations in the telescope lenses which could be reduced by using compound lenses in the telescopes (18) and (24). The pulse length of the output beam was 13 ns. The system gain was effectively over 1000, a factor of 400 above the single pass gain and the energy extracted was estimated to be 20 to 30% of the stored energy.

Figure 22:
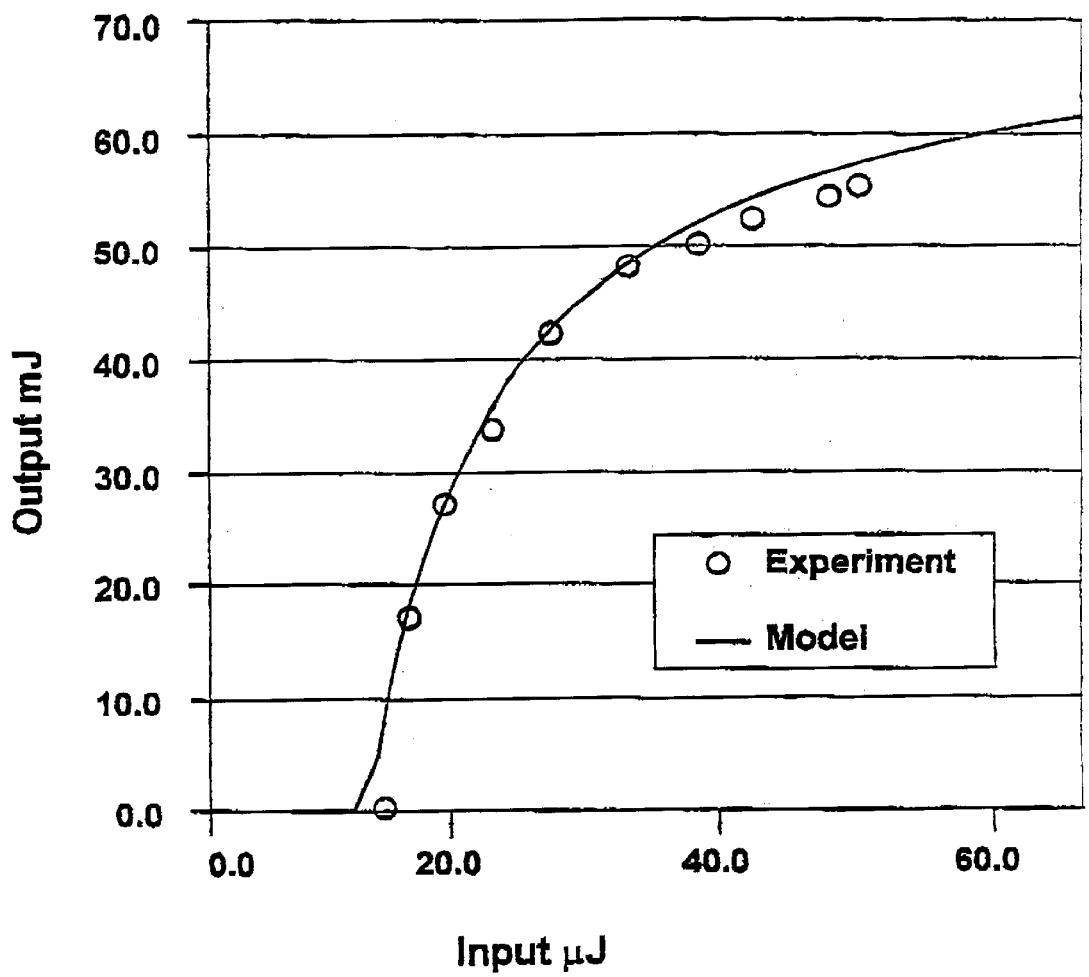
FIG. 22 shows a graph of the output energy of the system of FIG. 2 as a function of the input energy.

The system output energy according to simulation and experimental results is shown as a function of input energy in FIG. 22. In both the simulated and observed results there is a threshold below which no output energy is observed. This corresponds to the input light into the SBS cell (22) after six passes through the amplifier medium (20) being below the threshold value. As the input energy increases the output energy increases rapidly to a saturation level. The simulation suggests that at even higher input levels the output energy drops. This is because most of the energy is extracted by the light beam from the amplifier medium (20) before the beam is incident on the SBS cell (22) and the SBS cell is the lossiest element within the system.

In the arrangement shown in FIG. 2, a protective aperture stop (82—shown in dotted lines) could be located just in front of the mirror (29), ie. near a relay image plane of the amplifier system, so that no light reaches the edges of the amplifier medium (20). This may be necessary if the edges of the amplifier medium (20) are susceptible to damage from laser light.

FIG. 3 shows a plan view of a geometry similar to that shown in FIG. 2, with like parts identified with like numerals, in which a light beam passes through the amplifier medium (20) six times and then undergoes phase conjugation in the SBS cell (22) and the phase conjugate beam is then passed a further six times through the amplifier medium (20) before being output from the system at (48).

A beam steering device (52), such as an adjustable mirror with low damage threshold or an acousto-optic beam deflector is located between the laser (2) and the polariser (6). Two further relay imaging telescopes (54) and (56) are introduced into the arrangement. Each of the relay imaging telescopes (54) and (56) comprise two piano-convex lenses which are separated by a distance equal to the sum of the focal lengths of the two lenses. Both the telescopes have vacuum cells at the focus to prevent laser induced air breakdown at the focus of the lenses. In this way the aperture of the output of the beam steering device (52) is imaged at all the points marked A' (or A) in FIG. 3, which means that a light beam that passes through the output aperture of the beam steerer (52) will inevitably pass through all the points marked A' (or A) in FIG. 3. In this way, the direction of the output beam (48) can be steered (as shown by arrow (58)) by steering of the beam output from the laser (2) using the beam steerer (52).

Using this scheme it has been demonstrated that when a beam of 50 microjoule pulses is steered over an angle of 30 mrad, the output of the system is also steered by the same angle.

In an alternative embodiment of the invention, the beam steering device (52) may be replaced by a spatial light modulator or adaptive mirror which may impart a spatially dependent phase shift to the low power input beam from the laser (2). In this case the high power output beam will emerge from the system with an identical spatial phase pattern on the output beam. This configuration makes it possible to produce a high power beam with a controlled phase front by controlling the low power input beam with an adaptive mirror.

It is often desirable to have the angular separation $\theta$ between the beams as small as possible in order that the beams pass through the amplifying medium without clipping the edges of the amplifier medium. However, if $\theta$ is small, then it is necessary to have large focal lengths for the telescope lenses if the beams are arranged not to overlap at at least one of the telescope lenses. Large lens apertures are also required where the beams do not overlap at the telescope lens, since the area of the lens must be at least as large as the area of the beam multiplied by the number of passes through the amplifier medium.

Figure 18:
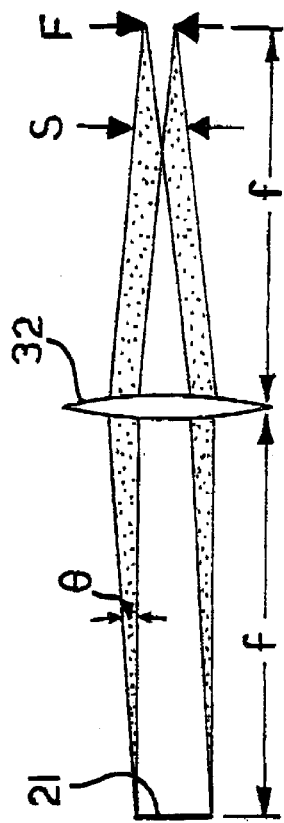
FIG. 18 shows a part of the arrangement shown in FIG. 17.

This can be solved as shown in FIG. 18 which shows the face (21) of the amplifier medium (20) and lens (32) of FIG. 2 by intercepting the beams close to the focal plane of the telescope. In FIG. 18 the two light beams shown overlap at the lens (32) but separate between plane (S) and the focal plane (F). Thus the beams can be separately intercepted by optical components such as a mirror or prism between the planes S and F, although it is preferred that the beams are not intercepted at or too close to the focal plane (F) because the beam strength becomes too strong and can damage the optical components. By intercepting a beam between the telescope lenses close to the focal plane of the telescope and allowing the light beams to overlap at the telescope lenses it is possible to use telescope lenses with smaller focal lengths and aperture sizes. It may be necessary to have a small evacuated cell in the telescope to avoid air breakdown.

Figure 17:
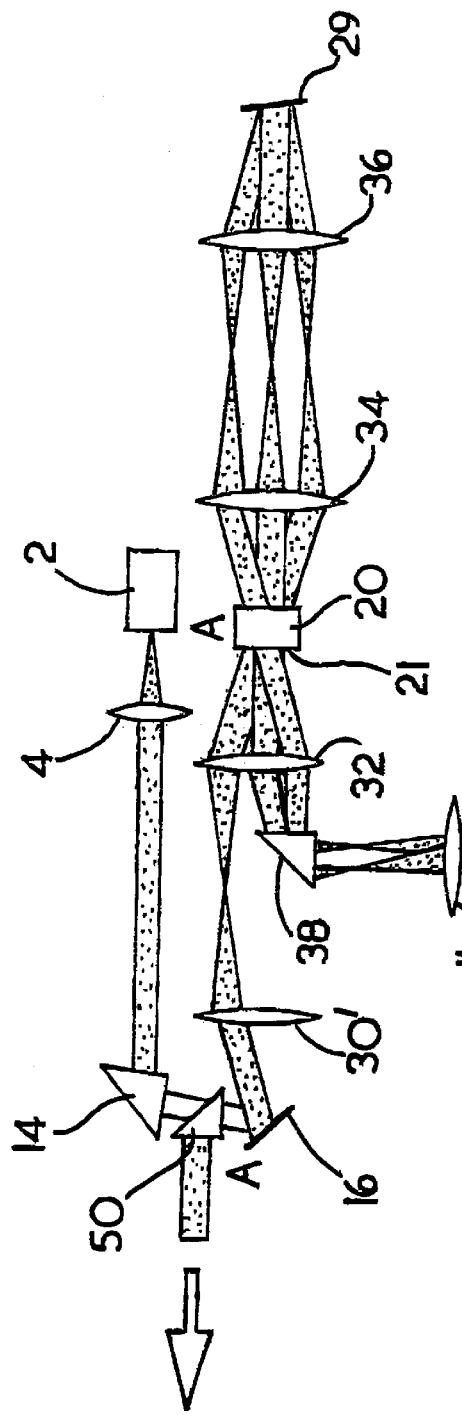
FIG. 17 shows an alternative geometry to that shown in FIG. 1 arranged such that the light beams overlap at the telescope lenses and the beams are spatially separated only near the focus of the telescope.

An arrangement similar to that shown in FIG. 1 (with like parts identified by like numerals) is shown in FIG. 17 but with the beams overlapping at the telescope lenses (30", 32, 34, 36). The first and sixth pass light beams travelling between mirror (16) and amplifier medium (20) are relay imaged by a relay imaging telescope comprising lenses (30') and (32). However, a prism (38) is located between lenses (30') and (32) close to the focal plane of the lens (32) to intercept the second to the fifth pass beams and direct them through lens (30") and onto mirror (26). In this way the second to the fifth pass beams are relay imaged between the amplifier medium (20) and the mirror (26) by relay imaging telescope comprising lenses (32) and (30"). The prism (38) should be placed a small distance from the focus of the telescope (32, 30") so that laser damage does not occur to the prism. It will be apparent that the arrangements shown in FIGS. 1 to 3, 5, 6, 8 to 11, 15, 19 and 20 can be altered in a similar way to the arrangement in FIG. 1 so that the light beams overlap at at least some of the telescope lenses.

Figure 21:
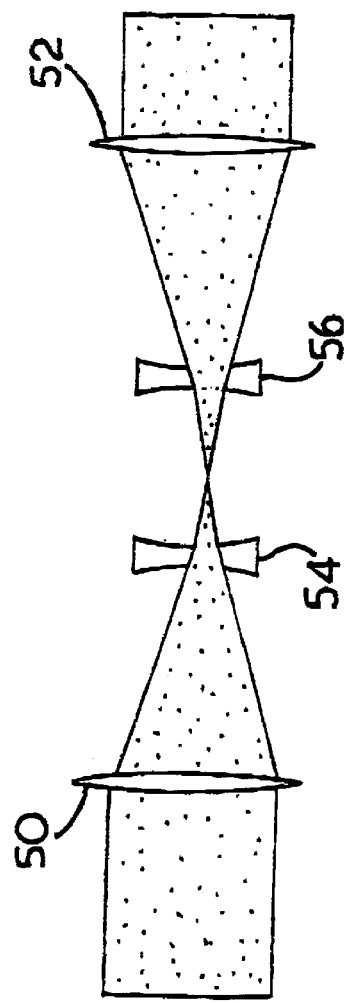
FIG. 21 shows an alternative design of relay imaging telescope which can be used in an amplifier system according to the present invention which uses compound lenses.

It is possible to design compound telescopes, such as that shown in FIG. 21, to act as relay imaging telescopes. The telescope shown in FIG. 21 comprises two converging lenses (50) and (52) and two diverging lenses (54) and (56). Using the diverging lenses (54) and (56) located close to the focus of the telescope causes the focal spot to be longer, so that the light pass beams which overlap at the lenses (50) and (52) and possibly also at the lenses (54) and (56) can be separated over a longer path. This will provide more space to insert a prism or a mirror while using lenses with relatively short focal lengths.

After passing through the amplifier system several times, the amplified beam may be aberrated due to imperfections in the optical system. These may be minimised by using, for example, compound lenses in the telescopes and other techniques as outlined later.

Figure 5:
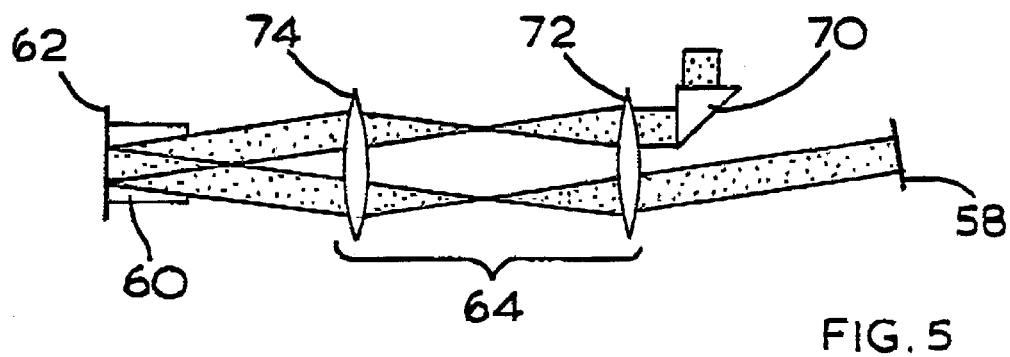
FIG. 5 shows a plan of the geometry of an optical amplifier system according to a second embodiment of the present invention which uses a single telescope and in which a light beam is passed four times through a reflecting slab amplifier.
Figure 7:
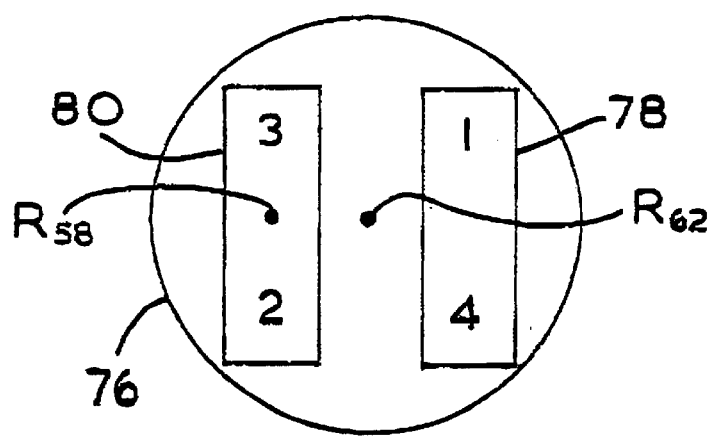
FIG. 7 shows a view of the aperture of the telescope and the positions of successively reflected light beam passing through the system of FIGS. 5 and 6.

The amplifier system shown in FIG. 5 has an amplifier medium (60) which has a reflecting mirror (62) located at one end of it and a relay imaging telescope (64) located to the other side of it and positioned so that the telescope (64) images the aperture of the reflecting mirror (62) onto mirror (58). The telescope (64) comprises a first lens (72) and a second lens (74) and the aperture of the first lens (72) is shown in FIG. 7 at (76). FIG. 7 also shows the aperture of the prism (70) at (78) and of the mirror (58) at (80).

An input or first pass light beam is directed by prism (70) into telescope (64) which images the input light beam through the amplifier medium (60) onto the mirror (62) of the amplifier medium (60). This first pass light beam passes through point 1 of the aperture (76) of the telescope lens (72) and aperture (78) of the prism (70) as shown in FIG. 7. The mirror (62) reflects the first pass light beam back through the amplifier medium (60) as a second pass beam and into the telescope (64) which images the aperture of the mirror (62) onto the mirror (58). The mirror (62) has a reflection point $R_{62}$ as shown in FIG. 7 and so the second pass beam passes through the aperture (76) of the lens (72) and the aperture (80) of the mirror (58) at point 2 in FIG. 7. The mirror (58) reflects the second pass light beam as a third pass light beam into the telescope (64) which images the aperture of the mirror (58) onto the mirror (62) and the third pass beam passes through the amplifier medium (60). The mirror (58) has a reflection point $R_{58}$ as shown in FIG. 7 and so the third pass beam passes through the aperture (76) of the lens (72) and the aperture (80) of the mirror (58) at point 3 in FIG. 7, in a path that goes above the second path light beam (and so in the plan view of FIG. 5 only one of these beams can be seen). The mirror (62) reflects the third pass light beam as a fourth pass light beam through the amplifier medium (60) and into the telescope (64), which telescope images the aperture of the mirror (62) onto an output of the amplifier system via the prism (70). The mirror (62) has a reflection point $R_{62}$ as shown in FIG. 7 and so the forth pass beam passes through the aperture (76) of the lens (72) and the aperture

(78) of the prism (70) at point 4 in FIG. 7, along a path that lies below that of the first pass beam. In this configuration the constraining aperture is the aperture of the amplifier (60), and the configuration allows one to pass this aperture four times.

The geometry in FIG. 5 is more compact than those in FIGS. 1 to 3, but has the disadvantage that for a given amplifier slab dimensions it reduces the maximum practical crossing angle of the various beams in the amplifier medium.

Figure 6:
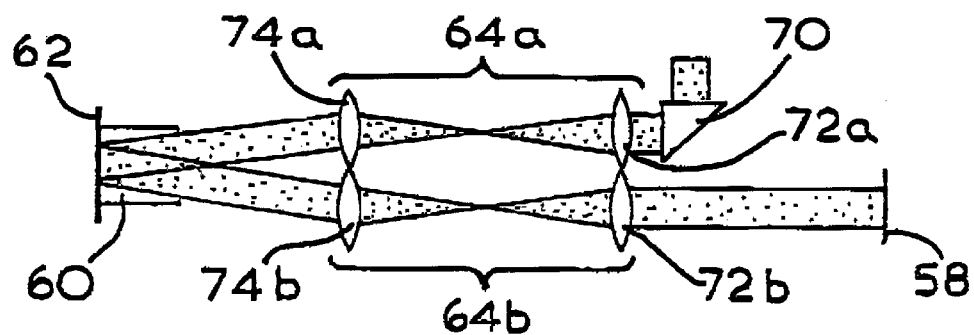
FIG. 6 shows a plan of the geometry of an optical amplifier system similar to that in FIG. 5 but which uses two telescopes.

FIG. 6 shows an arrangement which is similar to that shown in FIG. 5, with like parts identified with like numerals. The main difference is that in FIG. 5 there is one telescope (64) which relay images the aperture of the amplifier medium (60) onto the optical components (58, 70). This has the advantage that one telescope (64) can be used for all beams. In FIG. 6, there are two telescopes (64a) comprising lenses (72a) and (74a) and (64b) comprising lenses (72b) and (74b), each of which can relay image the aperture of the amplifier (60) onto an associated optical component (58) or (70). The configurations shown in FIGS. 5 and 6 can be combined with parts of the configuration shown in FIG. 2, by replacing the amplifier (20), telescope (24) and mirror (29) with an amplifier (60) and a mirror surface (62) as is shown in FIG. 8.

Figure 8:
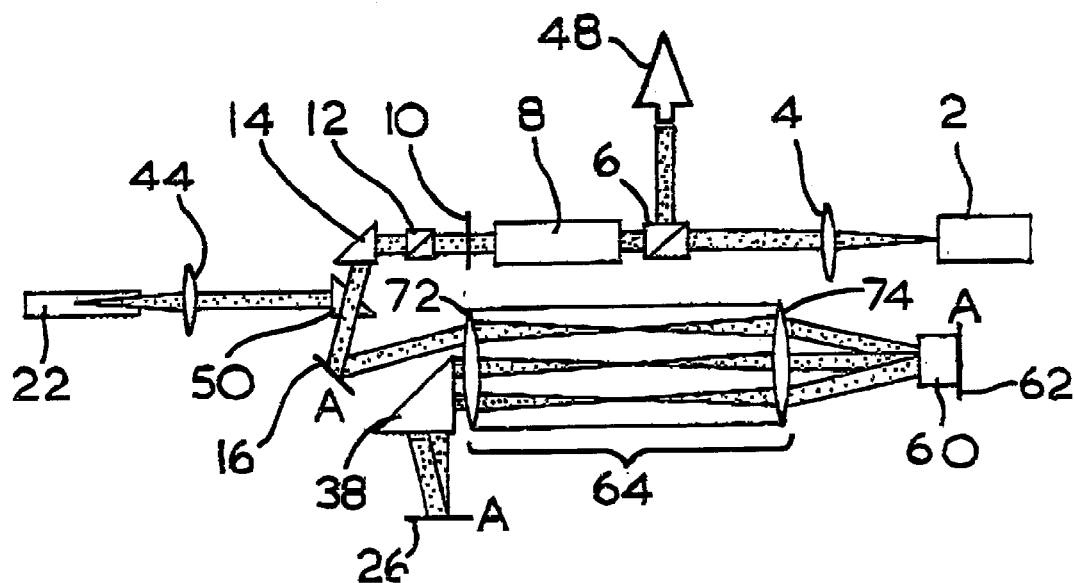
FIG. 8 shows a plan of the geometry of an optical amplifier system according to the second embodiment of the present invention which uses a single telescope and in which a light beam is passed twelve times through a reflecting slab amplifier.

In the arrangement in FIG. 8, which has like parts to those parts in FIG. 2 and like parts to those parts in FIG. 5, identified by like numerals, the amplifier is passed twelve times, before being transmitted by the output prism (50). Mirror (16) sends the input beam from the laser (2) into the reflecting slab comprising amplifier medium (60) and reflector (62). After two passes the beam is reflected by prism (38) to mirror (26) and goes back to the reflecting slab (60,62). It is then reflected back to mirror (26) via prism (38) and returns to mirror (16) and to prism (50). The prism (50) directs the light into SBS cell (22) and the beam then retraces its path through the system to output (48). The beam pattern at the aperture of the lens (72) of the telescope (64) is the same as is shown in FIG. 4.

Figure 9:
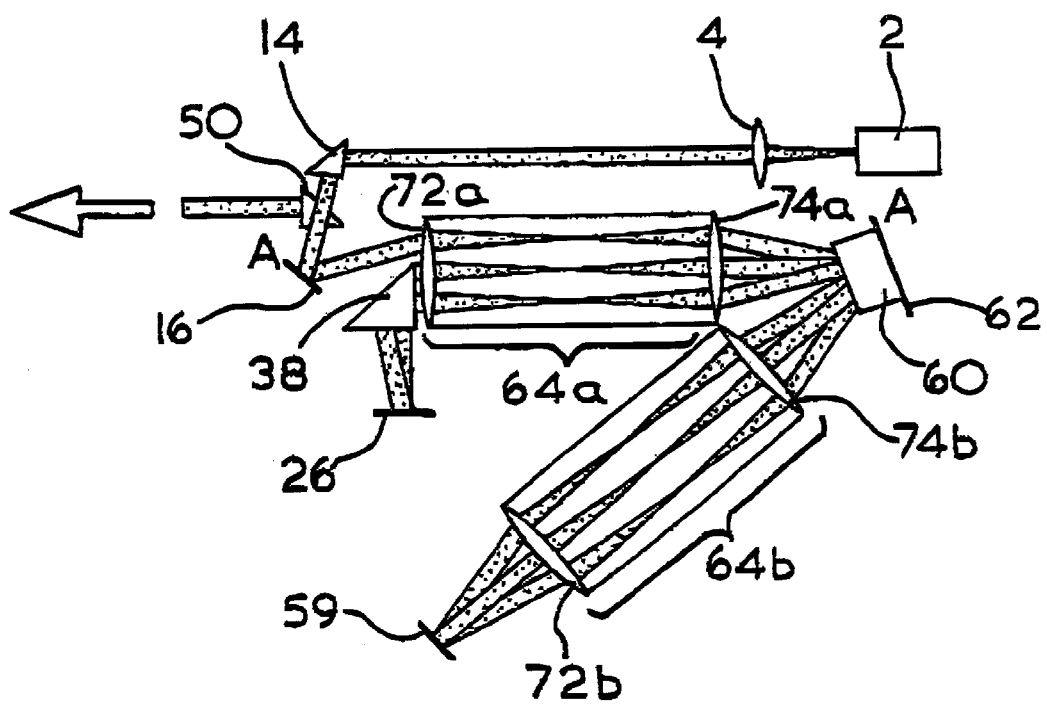
FIG. 9 shows a plan of the geometry of an optical amplifier system similar to that in FIG. 8 which uses an additional telescope and mirror in order to double the number of passes through the amplifier medium.

The arrangement in FIG. 9, has like parts to those parts in FIG. 1 and like parts to those parts in FIG. 6 identified by like numerals. In the FIG. 9 arrangement the slab amplifier (60, 62) is passed twelve times before being transmitted by output prism (50). Each beam incident on the reflector (62) from telescope (64a) is reflected into telescope (64b) and is reflected back into the slab amplifier (60, 62) by mirror (59) via telescope (64b). Each beam incident on the reflector (62) from telescope (64b) is reflected into telescope (64a) and directed by components (38,26,16).

In the amplifier systems discussed above, the relay telescopes, amplifier mediums, directional mirrors and prisms may leave a residual focus error which error will accumulate with each pass of light through the system. In the case where the residual focus error is caused by thermally induced lensing the effective focal length of the amplifier system after n light beam passes will be f/n, where f is the residual focal length of the amplifier after one pass.

The focussing error in the amplifier medium, for example due to thermal lensing, can be compensated for by placing a compensation lens (120) at a relay imaging plane as shown in FIG. 10. FIG. 10, shows an arrangement which is otherwise, identical to that in FIG. 2, with like parts identified with like numerals. The compensation lens (120) has an equal and opposite focal length to the thermally induced focal length of the slab (20). One can also adjust the degree of compensation by moving the compensation lens (120) along the axis of the amplifier system.

The arrangement in FIG. 11 is the same as that shown in FIG. 2, with like parts identified with like numerals except that mirror (29) is replaced by an adaptive mirror (122) in order to correct for phase errors produced by the amplifier medium (20). Each double pass through the amplifier medium (20) is interspersed with a reflection off the adaptive mirror (122).

In the arrangement in FIG. 12, again the amplifier system comprises an amplifier medium (104) appropriately positioned between two relay imaging telescopes (106) and (108). Right angled prisms (110) and (112) which are axially offset with respect to each other are used to direct light repeatedly through the amplifier system. The system is arranged so that the telescope (106) images the aperture of the amplifier medium (104) onto right angled prism (112) and telescope (108) images the aperture of the amplifier medium (104) onto prism (110). The six passes of the beams can be traced through the system as follows, an input beam (114) passes through the axis of prism (110) and becomes a first pass beam labelled 1 in FIG. 10, which passes along the axis of telescope (108), amplifier medium (104) and telescope (106) and into prism (112). As indicated above prism (112) is offset relative to prism (110) and so the first pass beam 1 enters prism (112) below the axis of the prism (112) and so prism (112) direct the first pass beam back through the system as a second pass beam, labelled 2 in FIG. 10. The second pass beam travels through the system to prism (110) which it enters offset relative to the axis of prism (110). This prism (110) directs the second pass beam back into the system as a third pass beam labelled 3 in FIG. 10. The path of the beam can thus be followed through its forth pass (labelled 4), its fifth pass (labelled 5) and its sixth pass (labelled 6) in FIG. 10. The sixth pass beam leaves the system travelling past the prism (110) to an output (116). It should be noted that in this embodiment the pass beams do not overlap in the amplifier medium (104) which can have the disadvantage of inefficient energy extraction on each pass as only a small volume of the amplifier medium (104) is transited on each pass. Also, damage can be caused to the amplifier medium on the latter light beam passes due to energy extracted from the rest of the amplifier medium (104) being directed through a small volume of the amplifier medium with high intensity.

Figure 12:
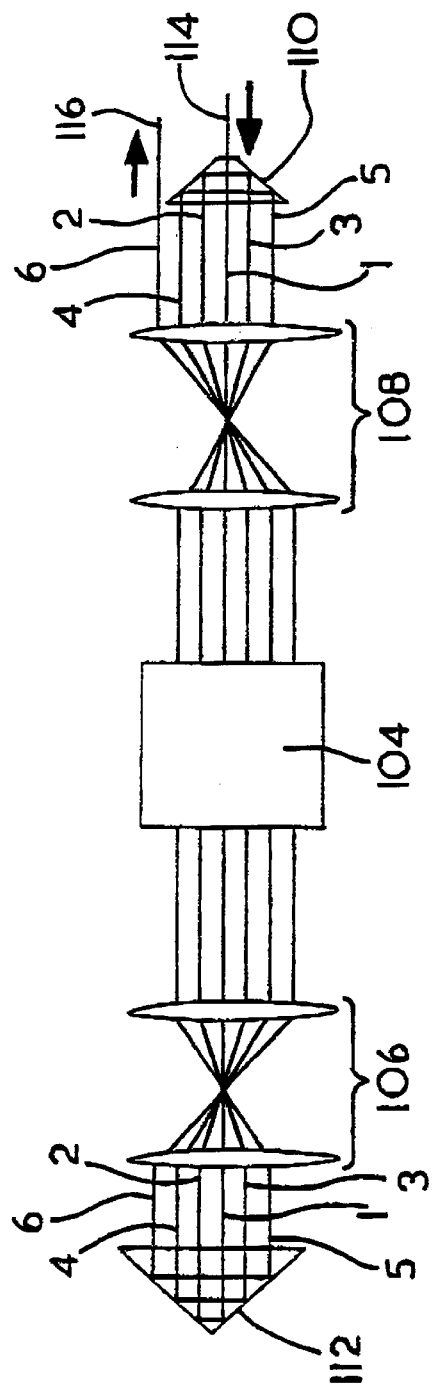
FIG. 12 shows a plan of the geometry of an optical amplifier system according to a fifth embodiment of the present invention in which a light beam is passed six times through an amplifier medium using right angle prisms to repeatedly direct the light through the system.
Figure 13:
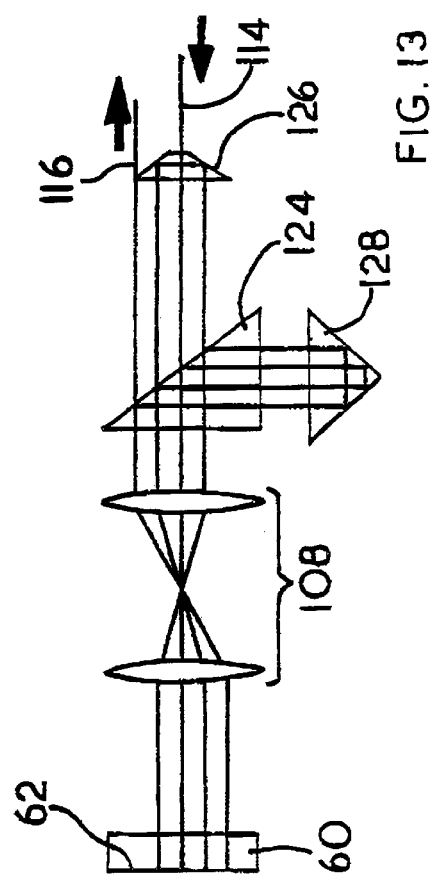
FIG. 13 shows a plan of the geometry of an optical amplifier system according to a sixth embodiment of the present invention using a reflective slab amplifier and a single telescope in which a light beam is passed eight times through an amplifier medium using right angle prisms to repeatedly direct the light through the system.

The right angled prism embodiment of FIG. 12 can also be adapted for an amplifier medium (60) with a reflecting surface (62), as shown in FIG. 13. In the FIG. 13 arrangement the beams reflected by right angled prism (124) lie below the plane of the beams which pass over prism (124) directly between the telescope (108) and the input (114), output (116) or right angled prism (126). The FIG. 13 arrangement is an eight pass arrangement, the input beam (114) passes through prism (126), over prism (124) and into telescope (108) and is imaged onto the aperture of the amplifier medium (60) as a first pass beam. It is then reflected by reflector (62) as a second pass beam through telescope (108) via prism (124) onto right angled prism (128) which directs the light beam, as a third pass beam into the amplifier medium (60) via the prism (124) and telescope (18). The reflector (62) reflects this beam as a fourth pass beam via telescope (108), over prism (124) and into prism (126). A further four passes occur as the prism (126) directs the light beam back into the telescope (108) and into the medium (60) and the beam travels again from medium (60) to prism (128) via prism (124) and back to the medium (60) via prism (124) and then to the output (116) over prism (124) and past prism (126). The right angled prisms used in the arrangements of FIGS. 12 and 13 could, for example, be Porro prisms.

The arrangements of FIGS. 12 and 13 could be used in conjunction with phase conjugation by introducing an SBS cell half way along the path of the light beam through the arrangement in a manner analogous to that described above in relation to FIG. 2.

Figure 14:
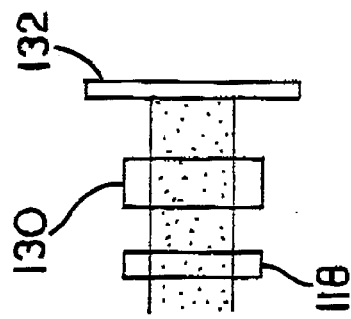
FIG. 14 shows a Pockels cell arrangement which can be used to replace the right hand mirror in the arrangement of FIG. 1 in order to avoid parasitic oscillation.

In order to reduce the effects of parasitic oscillation in a pulsed amplifier system according to the present invention, a Pockels cell and polariser can be used in front of one of the reflecting components of the system which reflects light back into the system, to selectively stop light from reaching that reflecting component. The Pockels cell arrangement is shown in FIG. 14 and could be used, for example to replace the mirror (29) of FIGS. 1 to 3. The light beam leaving telescope (24) would be directed through polariser (118), Pockels cell (130) and onto mirror (132) instead of onto mirror (29). The system would be arranged so that telescope (24) in FIGS. 1 to 3 would image the aperture of the amplifier medium (20) onto the mirror (132) of FIG. 14 and the mirror (132) would direct a light beam incident on it back into the amplifier medium (20) via the telescope (24). However, light will only pass through the Pockels cell arrangement in FIG. 14 and back into the telescope (24) when the Pockel cell is switched to zero voltage. When the Pockels cell has an appropriate voltage applied to it, it acts as a quarter wave plate and when the voltage is switched to zero it stops acting as one. Thus, if the Pockels cell (130) initially has a quarter wave voltage on it, it will prevent parasitic oscillation from taking place. Then if the voltage is switched to zero just before a laser pulse is directed through the system, then the pulse will be amplified before any parasitic oscillation within the amplifier system (ie. within the cavity formed by mirrors (29) and ("6) of FIGS. 1 to 3) would have time to build up and deplete the gain of the amplifier.

Figure 19:
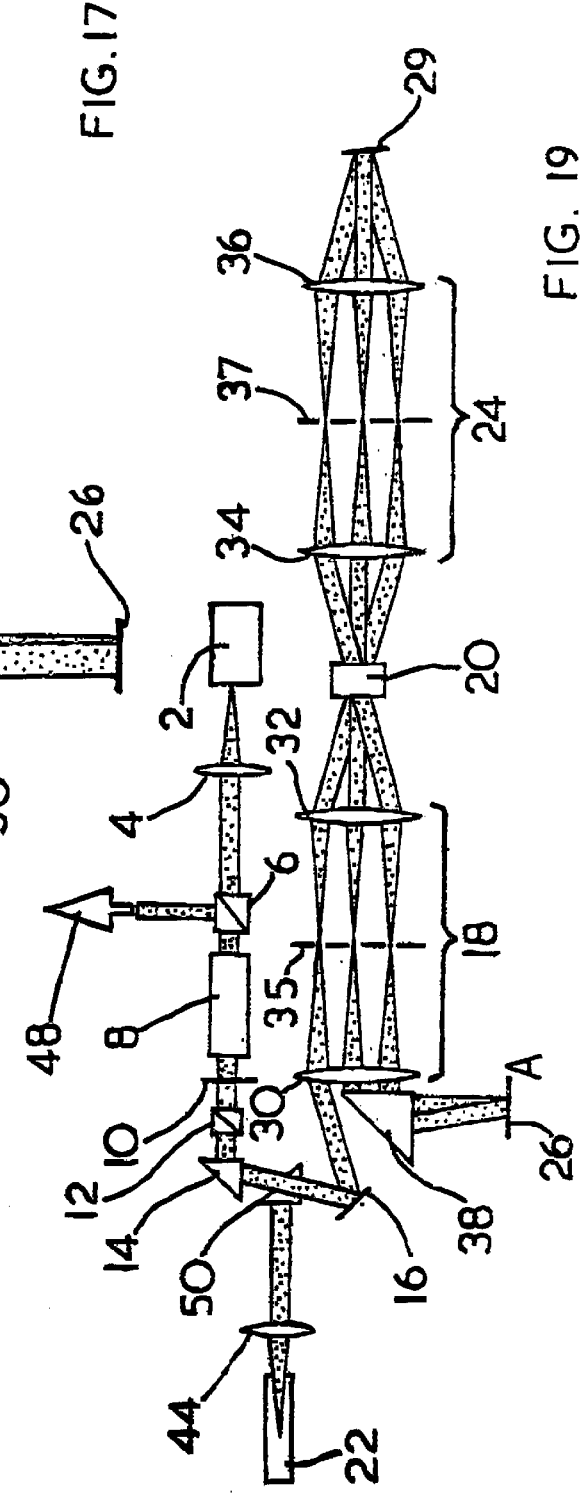
FIG. 19 shows an alternative arrangement to that shown in FIG. 2 in which apertured screens are used to prevent parasitic oscillations.

Another way to reduce parasitic oscillations is to place a limiting aperture at at least one point along the light beam passing through the amplifier system. Referring now to FIG. 19 which shows an arrangement similar to that shown in FIG. 2 (with like parts identified with like numerals) except that an opaque screen (35) in which is formed a plurality of apertures is located between the lenses (30) and (32) of telescope (18) and an opaque screen (37) in which is formed a plurality of apertures is located between the lenses (34) and (36) of telescope (24). The screens (35) and (37) are located at or close to the focal plane of the respective telescopes (18) and (24) and the apertures in each screen are aligned with the positions of the light beams passing through the respective telescopes. In an alternative embodiment one of the screens (35) or (37) could be dispensed with. In order to stop parasitic oscillations, the limiting apertures should be positioned such that when the light beam has passed through an aperture and then makes passes through the amplifier system until it reaches the next aperture in its path, then at said next aperture the beam should pass through only one aperture, ie. it should not have spread out to the extent that it can pass through two adjacent apertures located in the same screen.

Figure 15:
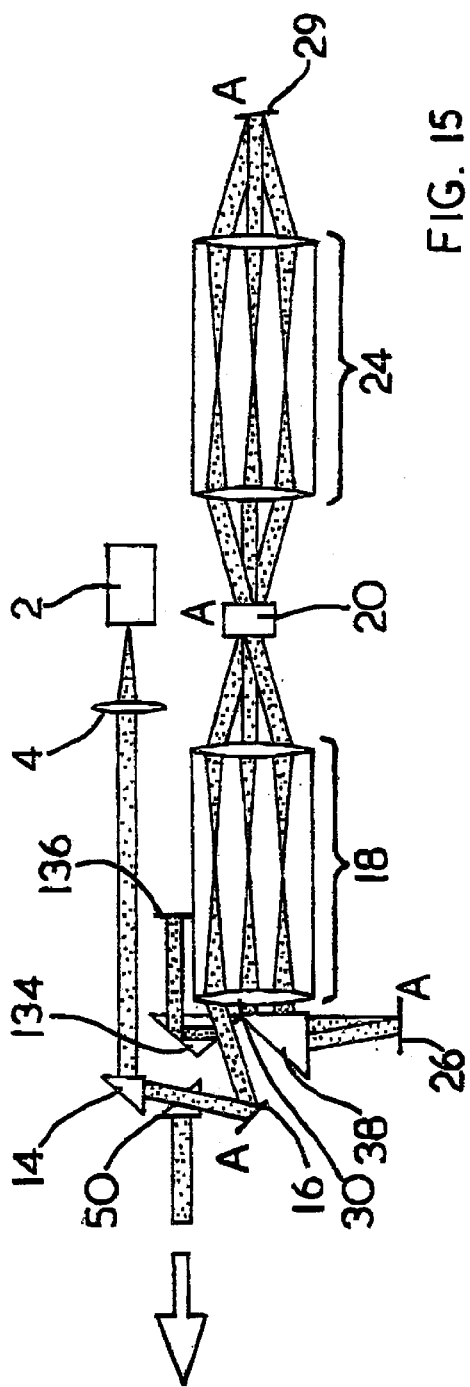
FIG. 15 shows an adaptation of the geometry of FIG. 1 in which a light beam is passed 12 times through an amplifier medium of the system.
Figure 16:
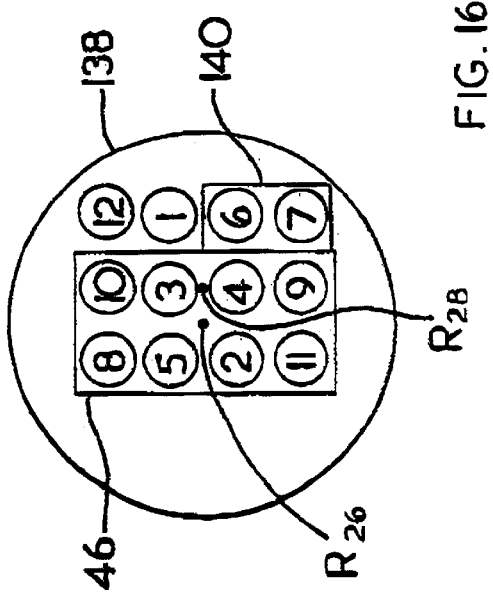
FIG. 16 shows a view of the aperture of the first telescope lens, the apertures of the two prisms and the positions of successively reflected light beams passing through the system in the geometry of FIG. 15.

It is possible to increase the number of transits through the amplifier system from six to twelve using an arrangement similar to that in FIG. 1, by inserting a further prism (134) and mirror (136) as shown in FIG. 15. The prism (134) lies below the two beams reflected off mirror (16). The aperture (138) of the lens (30) of the telescope (18) would then be as shown in FIG. 16. The rectangle (140) is the aperture of the prism (134) and the mirror (136) reflects beam 6 to form beam 7. The beam then passes through the amplifier system in a further six passes as indicated by beam numbers 7 to 12 in FIG. 16. Using this approach it is possible to arbitrarily increase the number of beams passing through the amplifier medium, subject to the size of the aperture of the telescope lenses and the build-up of aberrations in the laser beam.

Figure 20:
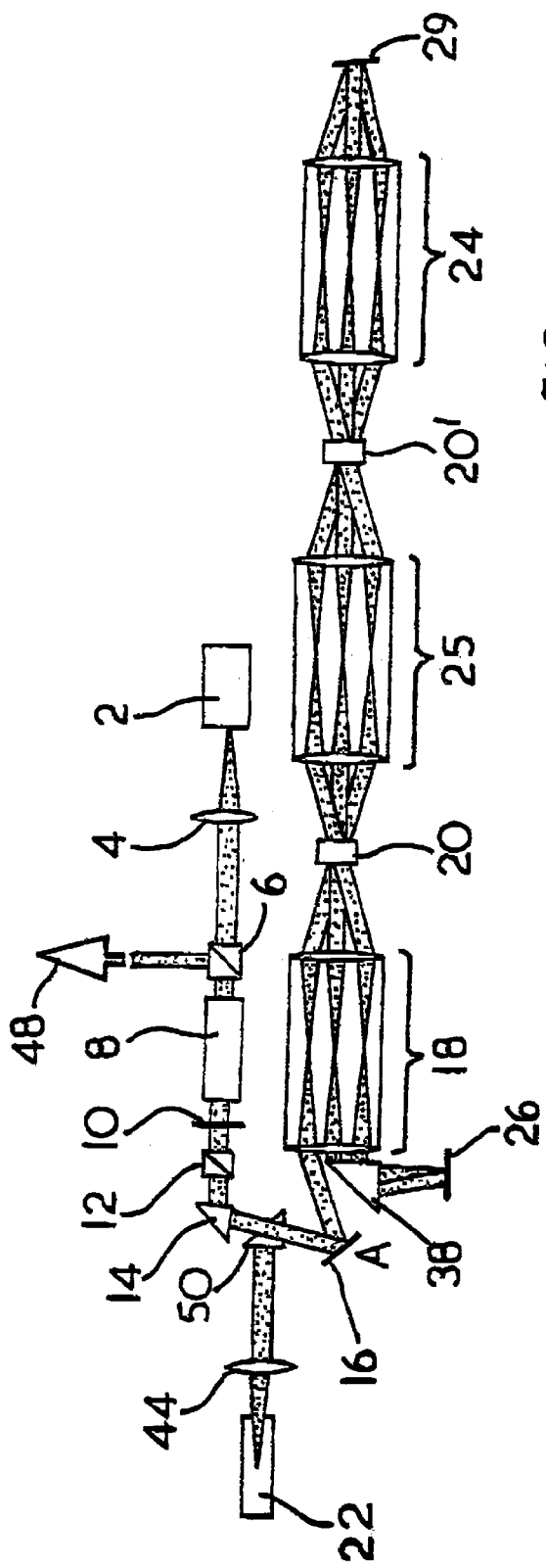
FIG. 20 shows an alternative geometry to that shown in FIG. 2 in which the amplifier medium is coupled to an additional amplifier medium using an additional relay imaging telescope.

The relay imaging telescope arrangements discussed above can be used to couple two or more amplifier mediums (20) and (20') as shown in FIG. 20 (with like parts identified by like numerals to those in FIG. 2). In FIG. 20 the amplifier mediums (20) and (20') are coupled by an additional relay imaging telescope (25).

It should be noted that any aberrations produced by the optical components will be added to the amplified beam on each transit through the amplifier system. Thus, it may be desirable to use compound lenses to compensate for spherical aberration experienced by off-axis beams in the telescope lenses, and compensation techniques as described above may be used to minimise the aberrations caused by for example thermal lensing in the amplifier medium.

The multi-pass amplifier system according to the present invention is suitable for use in continuous wave (cw) applications and so is not limited only to pulsed operation. Under a continuous wave operating regime, the effective gains seen by the various passes through the amplifier medium will be interdependent, as all passes will be present in the amplifier medium at the same time. Saturation effects caused by multiple passes being present in the amplifier at the same time means that the gain achievable for continuous wave operation will be lower than for the pulsed operation described above. A typical gain value achievable using a multi-pass amplifier according to the present invention for continuous wave applications may be in the region of 10.

What is claimed is:

1. A multi-pass optical amplifier system comprising:

an amplifier medium;

at least one relay imaging telescope for imaging light from the amplifier medium onto a primary light directing optical component and for imaging light directed back from a primary light directing optical component into the amplifier medium to that light is re-passed through the amplifier medium, and a phase conjugate mirror arrangement for intercepting light between passes of the amplifier medium to generate a phase conjugate reflection of the right incident on it;

characterised in that the system additionally comprises a controllable phase shifting means for imparting a spatially dependent phase shift to an input beam wherein the stem is arranged such that the aperture of the phase shifting means is imaged onto an aperture of the amplifier medium, such that the system generates an output beam with the spatially dependent phase shift applied to the input beam.

2. A multi-pass optical amplifier system comprising;

an amplifier medium;

at least one relay imaging telescope for imaging light from the amplifier medium onto a primary light directing optical component and for imaging light directed back from a primary light directing optical component into the amplifier medium so that light is re-passed through the amplifier medium, and a phase conjugate mirror arrangement for intercepting light between passes of the amplifier medium to generate a phase conjugate reflection of the light incident on it;

characterised in that the system additionally comprise a controllable beam steering means adjacent an input of the system wherein the system is arranged such that the aperture of the beam steering means is imaged onto an aperture of the amplifier medium, such that steering of a beam of light at the input into the system steers the beam of amplified light at the output from the system.

3. A system according to claim 2 and additionally comprising a controllable phase shifting means for imparting a spatially dependent phase shift to an input beam wherein tho system Is arranged such that the aperture of the phase shifting means is imaged onto an aperture of the amplifier medium, such that the system generates an output beam with the spatially dependent phase shut applied to the input beam.

4. A system according to claim 1 wherein the phase shifting means comprises a spatial light modulator.

5. A system according to claim 1 wherein the phase shifting means comprises an adaptive mirror.

6. A multi-pass amplifier according to claim 1 wherein the system is arranged such that light is incident on the phase conjugate mirror arrangement after having passed through the amplifier medium a predetermined number of times and the phase conjugate reflection retraces the path of the incident beam.

7. A multi-pass amplifier according to claim 1 wherein the system is arranged such that a light beam from the amplifier medium which is re-imaged into the amplifier medium is spatially separated from.

8. A system according to claim 1 wherein a first relay imaging telescope is located adjacent to a first side of the amplifier medium for imaging an aperture of the amplifier medium onto at least one primary light directing optical component located to said first side of said amplifier medium and a second relay imaging telescope is located to a second side of the amplifier medium for imaging the aperture of the amplifier medium onto at feast one primary light directing optical component located to said second side of the amplifier medium.

9. A system according to claim 1 wherein the amplifier medium comprises a reflecting surface located at first side of said amplifier medium and a relay imaging telescope is located to a second side of said amplifier medium for imaging an aperture of the amplifier medium onto at least one primary light directing optical component located to said second side of said amplifier medium.

10. A system according to claim 1 additionally comprising at least one input and/or output optical component(s) which intercept the light beam where it is spatially separated from itself and which co-operate with the primary light directing optical component(s) to direct a light beam from an input of the amplifier system, repeatedly through the amplifier medium and then to an output of the system.

11. A system according to any one of the preceding claims wherein at least one of the light directing optical components comprises a prism.

12. A system according to claim 1 wherein a light beam passing through the system overlaps its light path in the amplifier medium as it passes repeatedly through the amplifier medium.

13. A system according to claim 12 wherein the right beam overlaps at the lenses of the, or at least one of the, relay imaging telescopes.

14. A system according to claim 1 wherein at least one of the light directing optical components comprises a mirror.

15. A system according to claim 1 wherein at least one of the light directing optical components comprises a prism.

16. A system according to claim 15 wherein said prim is a Porro prism.

17. A system according to clam 15 wherein the primary light directing optical component(s) component at least two right angled prisms with optical axes which are offset relative to each other.

18. A system according to claim 8 wherein at least one of the input and/or output optical components comprises a mirror.

19. A system according to claim 10 wherein at least one of the input and/or output optical components comprises a prism.

20. A system according to claim 1 wherein the system additionally comprises a Faraday isolator arrangement for isolating a light beam input into the system from a light beam output from the system.

21. A system according to claim 1 wherein the system additionally comprises a compensation lens which is located at a relay imaging plane of the system and which has focal length selected to at least partially cancel out the effects of the thermally induced focal length of the amplifier medium.

22. A system according to claim 1 wherein at least one of the light directing optical components comprises an adaptive mirror in order to compensate for phase distortion within the system.

23. A system according to claim 1 wherein a shutter means is introduced into a part of the light path of a light beam passing through the system which part passes between two light directing optical components, which shutter means can be closed at predetermined time intervals to block the passage of light between the two light directing components.

24. A system according to claim 1 comprising two or more amplifying mediums each coupled to another by a relay imaging telescope.

25. A system according to claim 1 wherein a light beam travelling from the amplifier medium back to the amplifier medium is spatially separated from itself at or near a focal plane of the or one of the relay imaging telescopes.

26. A system according to claim 1 wherein the relay imaging telescope has a transfer matrix of the type $$P_T = \begin{matrix} -1/M & 0 \\ 0 & -M \end{matrix}$$

where M is a positive or a negative number.

27. A system according to claim 1 wherein the, or one of the, relay imaging telescope is made up of compound lenses.

28. A method of amplifying a beam of light by repeatedly passing said beam through an amplifier medium using a primary light directing optical component by imaging light from the amplifying medium onto said primary light directing optical component and imaging light directed back from a primary light directing optical component back into the amplifier medium using at least one relay imaging telescope and intercepting light between passes of the amplifier medium and using a phase conjugate mirror to generate a phase conjugate reflection of the light incident on it, characterised in that a light beam input into the system is steered using a beam steering means and the aperture of the beam steering means is imaged onto an aperture of the amplifier, such that steering of a beam of light at the input into the system steers the beam of amplified light at the output from the system.

29. A method of amplifying a beam of light by repeatedly passing said beam through an amplifier medium using a primary light directing optical component by imaging light from the amplifying medium onto said primary light directing optic component and imaging light directed back from a primary light directing optical component back into the amplifier medium using at least one relay imaging telescope and intercepting right between passes of the amplifier medium and using a phase conjugate mirror to generate a phase conjugate reflection of the light incident on it, characterised in that a light beam input into the system has imparted to it a spatially dependent phase shift using a controllable phase shifting means and the aperture of the phase shifting means is imaged onto an aperture of the amplifier, such that the system generates an output beam with the spatially dependent phase shift applied to the input beam.

30. A method according to claim 29 wherein said light beam input into the system is steered using a beam steering means such that steering of a beam of light at the input into the system steers the beam of amplified light at the output from the system.

31. A method according to claim 28 wherein a light beam incident on the phase conjugate mirror after having passed through the amplifier medium a predetermined number of times and the phase conjugate reflection retraces the path of the incident beam.

32. A method according to claim 28 wherein a light beam from the amplifier medium which is re-imaged into the amplifier medium is spatially separated from itself at at least one point in its path between passes of the amplifier medium to enable it to be intercepted by at least one additional light directing optical component(s).

33. A method according to claim 28 wherein a beam of light is passed from a first primary light directing optical component and a first relay imaging telescope both located to a first side of said amplifier medium, through said amplifier medium and through a second relay imaging telescope onto a second primary light directing optical component both located to a second side of said amplifier medium.

34. A method according to claim 28 wherein a beam of light is passed from a primary light directing optical component and a relay imaging telescope both located to a first side of said amplifier medium, through the amplifier medium and onto a reflecting surface located at a second side of the amplifier medium which reflects the light beam back through the amplifier medium and telescope.

35. A method according to claim 28 in which a light beam passing through the system is directed into the amplifier system using at least one input optical component and out of the amplifier system using at least one output optical component and is directed between the input and output optical components via said amplifier medium via said primary light directing optical components.

36. A method according to claim 28 wherein a light beam passing through the system overlaps its light path in the amplifier medium as it passes repeatedly through the amplifier medium.

37. A method according to claim 28 in which two or more amplifying mediums are coupled each to another by a relay imaging telescope.

38. A method according to claim 28 wherein a light beam travelling from the amplifier medium back to the amplifier medium is spatially separated from itself at or near a focal plane of the or one of the relay imaging telescopes.

39. A method according to claim 28 wherein the relay imaging telescope has a transfer matrix of the type $$P_T = \begin{matrix} -1/M & 0 \\ 0 & -M \end{matrix}$$

where M is positive or a negative number.

40. A method according to claim 28 wherein the, or one of the, relay imaging telescope is made up of compound lenses.

* * * * *

UNITED STATES PATENT AND TRADEMARK OFFICE
CERTIFICATE OF CORRECTION

PATENT NO.   : 6,700,698 B1
DATED        : March 2, 2004
INVENTOR(S)  : Scott

It is certified that error appears in the above-identified patent and that said Letters Patent is hereby corrected as shown below:

Column 18,
Line 61, "comprise" should read -- comprises --.

Column 19,
Line 3, "tho" should read -- the --;
Line 4, "is" should read -- is --;
Line 7, "shut" should read -- shift --;
Line 20, after "from" the following should be inserted: -- itself at at least one point in its path between passes of the amplifier medium in order that it can be intercepted by additional light directing optical components --;
Line 28, "feast" should read -- least --;
Lines 45-47, should read as follows:
-- 11. A system according to claim 1 wherein at least one of the input and output optical component(s) is/are arranged such that the relay imaging telecope(s) images an aperture of the amplifier medium onto the input and/or ouptut optical component(s). --
Line 59, "prim" should read -- prism --;
Line 62, "component(s) component" should read -- component(s) comprise --.

Column 20,
Lines 33-35, should read as follows:
$$P_T = \begin{bmatrix} -1/M & 0 \\ 0 & -M \end{bmatrix}$$

UNITED STATES PATENT AND TRADEMARK OFFICE
CERTIFICATE OF CORRECTION

PATENT NO.    : 6,700,698 B1
DATED         : March 2, 2004
INVENTOR(S)   : Scott It is certified that error appears in the above-identified patent and that said Letters Patent is hereby corrected as shown below:

Column 22,
Lines 24-26, should read as follows:
$$P_T = \begin{bmatrix} -1/M & 0 \\ 0 & -M \end{bmatrix}$$

Signed and Sealed this

Twenty-fourth Day of August, 2004

JON W. DUDAS
*Director of the United States Patent and Trademark Office*